US008978056B2

(12) United States Patent
Albal et al.

(10) Patent No.: US 8,978,056 B2
(45) Date of Patent: Mar. 10, 2015

(54) VIDEO LOADING CONTROL

(75) Inventors: Nandakishore Albal, Scottdale, AZ (US); John Harris, Glenview, IL (US)

(73) Assignee: Nokia Siemens Networks Oy, Oy Espoo (FI)

(*) Notice: Subject to any disclaimer, the term of this patent is extended or adjusted under 35 U.S.C. 154(b) by 0 days.

(21) Appl. No.: 13/314,324

(22) Filed: Dec. 8, 2011

(65) Prior Publication Data
US 2013/0152115 A1    Jun. 13, 2013

(51) Int. Cl.
H04N 7/173    (2011.01)
H04N 7/16     (2011.01)
H04N 17/00    (2006.01)
H04N 7/14     (2006.01)

(52) U.S. Cl.
USPC ............. 725/14; 725/110; 725/139; 348/181; 348/14.08

(58) Field of Classification Search
USPC ........ 725/62, 24; 370/332; 709/206; 455/445
See application file for complete search history.

(56) References Cited

U.S. PATENT DOCUMENTS

| 5,617,150 | A  | * | 4/1997  | Nam et al. .................... 348/700 |
| 6,597,906 | B1 |   | 7/2003  | Van Leeuwen et al. ....... 455/422 |
| 7,451,177 | B1 | * | 11/2008 | Johnson et al. ............... 709/203 |
| 7,870,593 | B2 | * | 1/2011  | Stuckman et al. ............. 725/142 |
| 7,895,629 | B1 | * | 2/2011  | Shen et al. .................... 725/62 |
| 2002/0142773 | A1 |  | 10/2002 | Rudrapatna et al. .......... 455/440 |
| 2003/0229813 | A1 | * | 12/2003 | Shiiyama ..................... 713/300 |
| 2004/0192309 | A1 | * | 9/2004  | Watanabe et al. ............. 455/439 |
| 2005/0166153 | A1 |  | 7/2005  | Eytchison et al. ............. 715/747 |
| 2007/0011343 | A1 |  | 1/2007  | Davis et al. ................... 709/231 |
| 2007/0157260 | A1 | * | 7/2007  | Walker .......................... 725/86 |
| 2009/0201988 | A1 | * | 8/2009  | Gazier et al. ............. 375/240.06 |
| 2009/0249405 | A1 | * | 10/2009 | Karaoguz et al. ............... 725/62 |
| 2009/0249424 | A1 | * | 10/2009 | Gordon et al. ................ 725/118 |
| 2010/0061448 | A1 |  | 3/2010  | Zhou et al. ............... 375/240.03 |
| 2010/0268836 | A1 |  | 10/2010 | Jabri et al. .................... 709/231 |
| 2011/0002405 | A1 | * | 1/2011  | Raveendran ................... 375/260 |
| 2011/0007713 | A1 | * | 1/2011  | Kobayashi .................... 370/332 |
| 2011/0087741 | A1 | * | 4/2011  | Stern et al. .................... 709/206 |
| 2011/0138427 | A1 | * | 6/2011  | Shen et al. ..................... 725/62 |
| 2011/0167128 | A1 |  | 7/2011  | Raghunathan et al. ....... 709/217 |
| 2011/0237264 | A1 | * | 9/2011  | Silver ........................... 455/445 |
| 2011/0288936 | A1 | * | 11/2011 | Cumming .................. 705/14.58 |
| 2012/0039391 | A1 | * | 2/2012  | Frusina et al. ........... 375/240.07 |

(Continued)

FOREIGN PATENT DOCUMENTS

EP    1672318 A2    6/2006
EP    1959703 A1    8/2008

OTHER PUBLICATIONS

"Mobile Smatloading", http://www2.alcatel-lucent.com/multimedia/msl.php, Nov. 15, 2011, 2 pgs.
Smart Caching for Continuous Broadband Services in Intermittent Wireless Networks:, Gobbels, Stephan, Communication Networks (ComNets), RWTH Aachen University, 2009, 1 pg.

(Continued)

Primary Examiner — Nasser Goodarzi
Assistant Examiner — Tariq Gbond
(74) Attorney, Agent, or Firm — Harrington & Smith

(57) ABSTRACT

The specification and drawings present a new method, apparatus and software related product (e.g., a computer readable memory) for controlling loading (e.g., pre-filling) of video data to a user equipment by a wireless network (e.g., from internet) while the video is played by the user equipment using an additional pre-filling based on predicted degradation of connectivity of the user equipment with the wireless network to avoid interruption or deterioration of playing the video and/or to reduce video data loading cost.

20 Claims, 3 Drawing Sheets

(56) References Cited

U.S. PATENT DOCUMENTS

| | | | |
|---|---|---|---|
| 2012/0147946 A1* | 6/2012 | Gao et al. | 375/240.02 |
| 2012/0260296 A1* | 10/2012 | Mallet et al. | 725/62 |
| 2013/0136138 A1* | 5/2013 | Miller et al. | 370/395.53 |

OTHER PUBLICATIONS

"Content Adapters", Dilithium Products, http://www.dilithiumnetworks.com/products/DCA/asp; Nov. 2, 2011, 2 pgs.

* cited by examiner

VIDEO LOADING CONTROL

TECHNICAL FIELD

The exemplary and non-limiting embodiments of this invention relate generally to wireless communications and more specifically to control loading of video data to user equipment by a wireless network while the video data is played by the user equipment.

BACKGROUND ART

The following abbreviations that may be found in the specification and/or the drawing figures are defined as follows:
3GPP Third Generation Partnership Project
CDMA Code Division Multiple Access
CAN Content Aware Network
CAN-EG Content Aware Network—Enabling Gateway
CDN Content Distribution Network
C-SON Centralized Self Optimizing Network
DL Downlink
E-UTRA Evolved Universal Terrestrial Radio Access
eNB or eNodeB Evolved Node B/Base Station in an E-UT-RAN System
EPC Enhanced Packet Core
E-UTRAN Evolved UTRAN (LTE)
FDD Frequency Division Duplex
FDM Frequency Division Multiplexing
GPS Global Positioning System
GSM Global System for Mobile Communications
HetNET Heterogeneous Network
HO Handoff
IP Internet Protocol
LTE Long Term Evolution
LTE-A Long Term Evolution Advanced
MAC Medium Access Control
MDT Minimization of Drive Tests
MME Mobility Management Entity
MO Media Optimizer
MR Measurement Report
PCRF Policy and Charging Rule Function
PDN-GW Packet Data Network Gateway
QAM Quadrature Amplitude Modulation
QPSK Quadrature (Quaternary) Phase Keying
RRC Radio Resource Control
RAN Radio Access Network
RF Radio Frequency
Rx Reception
SGW Serving Gateway
SON Self Optimizing Network
TDD Time Division Duplex
TDM Time Division Multiplexing
Tx Transmittance
UCI Uplink Control Information
UE User Equipment (e.g. mobile terminal)
UL Uplink
UMTS Universal Mobile Telecommunications System
UTRAN Universal Terrestrial Radio Access Network Media optimizer and adaptive streaming servers may provide a powerful technique for significantly increasing system capacity and video quality in wireless networks (e.g., LTE networks). For example, media optimizer and adaptive streaming servers downloading video to user equipment (e.g., camera-phone, smart phone, etc.) just in time to be played out conserve resources. This may be justified when, as it is very typical, the user aborts playing out a video before completing the video, so that no extra video data is loaded. However, this may not be helpful when, for example, the user drives into an area known to have no reception (e.g., a tunnel) and experiences a video freeze. Thus, interruption and/or deterioration of video reception in a mobile wireless device (user equipment) due to disruption of the wireless RF reception may cause negative user experience which needs to be improved

SUMMARY

According to a first aspect of the invention, a method comprises: monitoring by at least one network element of a wireless network a connectivity of a user equipment with the wireless network in response to video data being loaded to and played by the user equipment; and if it is determined by the at least one network element, using a predetermined criterion, that the connectivity is predicted to be degraded with no possibility for a handover to cause the played video data to be interrupted or deteriorated below an acceptable quality level, then providing by the at least one network element a warning signal comprising a determined information on the connectivity to at least one further network element in the wireless network to adjust one or more parameters for loading the video data to the user equipment to provide an additional pre-filling of the video data before the connectivity is degraded to cause playing the video data substantially without interruption.

According to a second aspect of the invention, an apparatus comprises: at least one processor and a memory storing a set of computer instructions, in which the processor and the memory storing the computer instructions are configured to cause the apparatus to: monitor in a wireless network a connectivity of a user equipment with the wireless network in response to video data being loaded to and played by the user equipment; and if it is determined, using a predetermined criterion, that the connectivity is predicted to be degraded with no possibility for a handover to cause the played video data to be interrupted or deteriorated below an acceptable quality level, then provide a warning signal comprising a determined information on the connectivity to at least one further network element in the wireless network to adjust one or more parameters for loading the video data to the user equipment to provide an additional pre-filling of the video data before the connectivity is degraded to cause playing the video data substantially without interruption.

According to a third aspect of the invention, a non-transitory computer readable memory encoded with a computer program comprising computer readable instructions recorded thereon for execution a method comprises: monitoring by at least one network element of a wireless network a connectivity of a user equipment with the wireless network in response to video data being loaded to and played by the user equipment; and if it is determined by the at least one network element, using a predetermined criterion, that the connectivity is predicted to be degraded with no possibility for a handover to cause the played video data to be interrupted or deteriorated below an acceptable quality level, then providing by the at least one network element a warning signal comprising a determined information on the connectivity to at least one further network element in the wireless network to adjust one or more parameters for loading the video data to the user equipment to provide an additional pre-filling of the video data before the connectivity is degraded to cause playing the video data substantially without interruption.

BRIEF DESCRIPTION OF THE DRAWINGS

For a better understanding of the nature and objects of the present invention, reference is made to the following detailed description taken in conjunction with the following drawings, in which.

DETAILED DESCRIPTION

A new method, apparatus, and software related product (e.g., a computer readable memory) are presented for controlling loading (e.g., pre-filling) of video data to a user equipment by a wireless network (e.g., from internet) while the video is played by the user equipment. It is noted that in the following, for the purpose of this invention, the term "video data" may be equivalent to "video clips", "video", "video/audio data", "media", "media data", "video and audio data" or "audio data".

In an exemplary embodiment, for macro networks (e.g., in LTE networks) there is addition of new signaling capability and improved video delivery techniques for a CAN gateway (e.g., to create a CAN-EG), a media optimizer or content servers, enhanced eNodeB (evolved Node B, also abbreviated as "eNB") and other network entities of the radio access network or the core. It is also noted that the term "eNB" is commonly applied to LTE (long term evolution) networks. However, the exemplary embodiments are not limited to LTE and may be applied to other ratio access technologies like GSM/UMTS (global system for mobile communications/universal mobile telecommunications system), CDMA (code division multiple access) and LTE-A (LTE-advanced).

Figure 1:
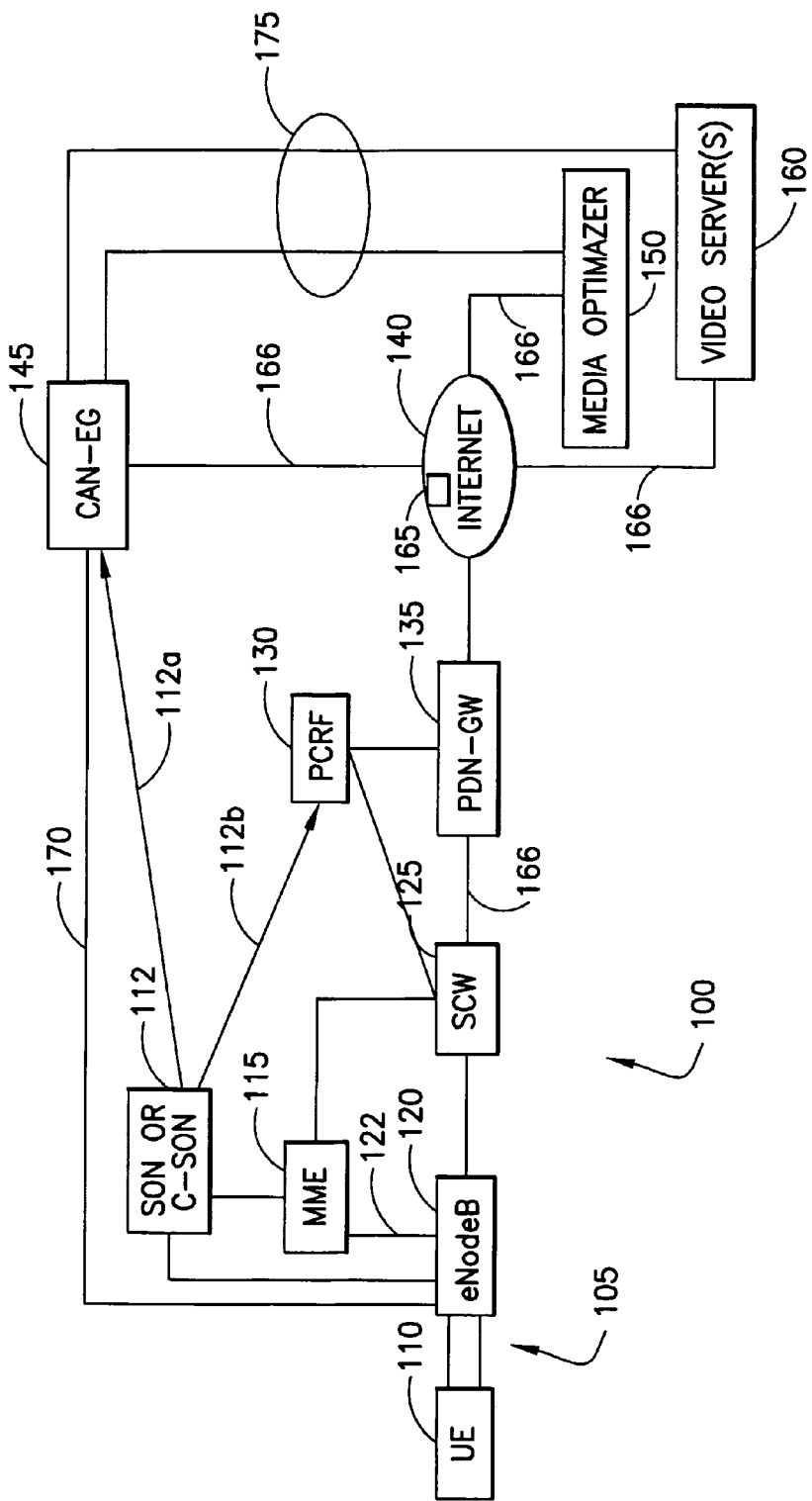
FIG. 1 is block diagram of exemplary systems in which the instant invention may be used.

FIG. 1 illustrates a block diagram of an exemplary system into which the instant invention may be used. FIG. 1 is an example of a video server—RAN interfaced architecture for a macro cell. The architecture shows a user equipment 110 communicating via a wireless connection 105 (including uplink and downlink) to a network 100. The network 100 includes an eNode B 120, a (centralized) self optimizing network (SON or C-SON) 112, a serving gateway (SGW) 125, a mobility management entity (MME) 115, a policy and charging rules function (PCRF) network element 130, a packet data network gateway (PDN-GW) 135, a content aware network-enabling gateway (CAN-EG) 145, a media optimizer 150, and video server(s) 160. The network 100 is coupled to the Internet 140 and in particular to a content source 165 in the Internet 140.

The eNodeB 120 is connected to the SGW 125, e.g., via an S1 interface. The SGW 125 is connected to the PDN-GW 135, e.g., via an S5/S8 interface. The SGW 125 is also connected to the PCRF 130, e.g., via a Gxx/Gxa interface. The SGW 125 is further connected to the MME 115, e.g., via an S11 interface. The PDN-GW 135 is connected to the PCRF 130 over a network 136, e.g., via a Gx interface. The Internet 140 is connected to the CAN-EG 145, the media optimizer 150, the video server(s) 160, and the PDN-GW 135 via multiple networks 166 implementing at least internet protocol (IP) interfaces. A network 175 implements, e.g., a diameter protocol (providing, e.g., an Authentication, Authorization and Accounting (AAA) framework) over a stream control transmission protocol (SCTP), a transport layer protocol. A network 170 between the CAN-EG and the eNodeB 120 may implement a GTP-u interface. GTP stands for GPRS tunneling protocol, where GPRS stands for general packet radio service. GTP-u is a GPRS tunneling protocol user plane. As is known, GTP-U protocol is used over S1-U, X2, S4, S5, and S8 interfaces of the Evolved Packet System (EPS).

It is noted that the entities in the network 100 are merely exemplary, and there may be different, fewer, or more entities. Also network elements shown in FIG. 1 may be located in different parts of the network. Furthermore, the various networks and the corresponding implementation of interfaces and/or protocols are also merely exemplary. It should also be noted the elements of the "radio access network" (RAN) are radio access technology (RAT) specific. For instance, in LTE, network is defined as EUTRAN/EPC (Enhanced UTRAN/Enhanced Packet Core). The eNodeB may be the only component of the RAN/EUTRAN, whereas the MME, SON (or C-SON), SGW, PDN-GW, PCRF may be parts of the EPC. In UMTS, the Node B and the RNC (radio network controller) are part of the RAN while the SSGN, GGSN, PCRF are part of the core.

In this example, the UE 110 may connect to the content source 165 in the Internet 140 to download video via the media optimizer 150. Optimized content is streamed from the media optimizer 150 or video server 160 to the PDN-GW 135 which forwards the content to the SGW 125 and finally through the eNodeB 120 to the UE 110. The CAN-EG may allow the video server 160 and media optimizer 150 to establish and modify the bearer characteristics between the PDN-GW 135 and the UE 110 by making the requests via the CAN-EG 145. The CAN-EG 145 may also collect network metrics from the eNodeB 120 and other network elements and report these to the media optimizer 150 and video server 160. Additionally the media optimizer 150 and video servers 160 may communicate with the eNodeB 120 using the network 170 via the CAN-EG. The video server(s) 160 in this example act to cache video from the content source(s) 165. As such, the video server(s) 160 may be considered surrogate servers, since these servers 160 contain cached copies of the videos in the content source 165.

Also "small" cell architectures, such as pico or femto cells (e.g., for LTE-A) may be used for practicing exemplary embodiments of the invention, using, for instance, "zone" eNB (ZeNB) controller (controlling multiple eNBs) and content delivery network (CDN) surrogate.

In one embodiment of the invention, at least one network element (e.g., SON, C-SON Node B or eNB, MME shown in FIG. 1) of a wireless network (e.g. the wireless network 100 shown in FIG. 1) may monitor and determine a connectivity of a UE (e.g., a mobile phone, a wireless device, a camera phone, a smart phone, a wireless mobile device and the like) with the wireless network in response to the video data being loaded to and played by the UE (i.e., the video data is played by the user equipment while this video data is loaded).

It is further noted, that for the purpose of this invention, the term "connectivity" may have a broad interpretation. For example, a connectivity level may be indicative of a power of a signal carrying the video signal, which is received by the UE. Also the term "connectivity" may be associated with an information capacity/load (or throughput) of a communication channel, or with a cost of transmitting information from the corresponding application through the wireless network to the UE (e.g., the cost for one bit of information) which may depend, e.g., on the modulation scheme, etc.

Then according to an embodiment, the at least one network element may determine, using a predetermined criterion, that the connectivity may be predicted to be degraded with no possibility for a handover, so that playing the video data in the user equipment will be interrupted or deteriorated below an acceptable level of video quality. Then the at least one network element may provide a warning signal (e.g., shown as signal 112a or 112b provided by the SON 112 in FIG. 1) comprising a determined information on the connectivity (e.g., the timing information including the time when the degradation of the connectivity may occur) to at least one further network element (e.g., CAN-EG, PCRF or MO shown in FIG. 1) in the wireless network to adjust one or more parameters (e.g., increasing available usage capacity of the channel transmitting video data and/or possibly using data compression, etc., as further explained below) for loading the video data to the user equipment by providing an additional pre-filling of the video data before the connectivity is degraded, so that the video data may be played substantially without interruption or deterioration above an acceptable video quality level. The warning signal may be used by the at least one further network element (e.g., CAN-EG, PCRF or MO) to generate (using information comprised in the warning signal) and provide instructions for adjusting the at least one parameter to an application providing the video data for the loading to the user equipment.

The determined information may comprise a predicted time interval after which the predicted interruption (e.g., RF loss) or deterioration of the playing video data will begin, and a predicted duration of time during which the predicted interruption or deterioration of the playing video data will happen unless the pre-filling of the video data is provided. The determined information may also include a likelihood (e.g., probability as a percentage) of the RF power loss, an expected percentage of the RF power loss after "impending Handoff", etc.

This information may be used by the wireless network (e.g., by the further network element) for determining the amount of media (e.g., video data) to pre-fill to a client (user equipment).

Instead of throttling the video data, the application may be instructed (e.g., by the least one further network element) to use available unused capacity of the wireless channel for transmitting video data to the user equipment for the additional pre-filling. For example, if the wireless video channel capacity is 1 Mb/s and a normal video data rate is 0.3 Mb/s, then the remaining 700 Kb/s may be used for pre-filling purposes, i.e., sending video data in advance. If, however, it is determined that 700 Kb/s of extra capacity available in the wireless channel is not enough to prevent interruption of playing the video, then the video data compression may be used as well (the video data compression may be also used as the main adjusted parameter for pre-filling purposes if, e.g., there is no extra wireless video channel capacity is available). Even though the video compression is still possible according to this exemplary embodiment of the invention, the additional pre-filling approach described herein may eliminate or reduce the need for using video compression compared, e.g., to the just-in-time fetching approach.

A goal of this embodiment is to provide substantially uninterrupted user experience, while playing the video data which is further illustrated below.

For example, when the UE in the LTE (macro cell) or in the LTE-A (HetNET or pico cell), a coverage gap may be predicted/anticipated, e.g., if the user is moving in a direction of a tunnel (or generally, an area known to have no reception) where there is no coverage (no HO is possible), i.e., leading to a complete loss of connectivity (RF power). Then, according to the embodiment of the invention, the additional pre-filling may be used to provide playing the video without interruption while driving through the tunnel.

Moreover, the additional pre-filling may be used not only in a situation of anticipated complete power loss, but also, for example, when it is anticipated an increase in a video information volume for the loading video data beyond at least one predefined threshold value (e.g., beyond the maximum transmission capacity/connectivity of the wireless channel). In other words, in this situation a throughput (or a maximum channel information capacity) may be expected to be (or to drop) below a level which is not sufficient to handle an anticipated bit rate of video (media) data. For example, if the video application is capable of adapting its video bit rate between 1 Mb/s and 0.3 Mb/s depending on the speed of the wireless link, then 0.3 Mb/s can be thought of as the minimum bit rate tolerable for this application. In this case, if the channel throughput is expected to drop down to 0.1 Mb/s for some time (e.g., about 20 seconds) then prediction can result in the additional pre-filling as described herein. Furthermore, this embodiment may be supported by messaging between the network elements wherein the minimum bit rate that application can drop to may be queried by the CAN-EG, and provided by the application server for media optimizer. For example, this attribute can then be provided by the CAN-EG to the eNB or PCRF.

It is further noticed that the predicted/determined information about the throughput deficiency (as well as about the coverage gap as stated earlier) may comprise a predicted time interval after which the predicted interruption or deterioration of the playing video data will begin and a predicted duration of time during which the predicted interruption or deterioration of the playing video data will last unless the additional pre-filling is provided.

According to a further embodiment, the at least one network element (e.g., SON, C-SON, Node B or eNB, MME, CAN-EG shown in FIG. 1) may further determine, based on a further predetermined criterion, that the connectivity is predicted to be degraded in such a way that a cost for the loading video data will increase beyond at least one threshold. Then the at least one network element may provide a second warning signal comprising a further determined information on the connectivity to the at least one further network element (e.g., CAN-EG, PCRF, MO, server shown in FIG. 1) in the wireless network to adjust the one or more parameters for loading the video data to the user equipment to provide the pre-filling before the connectivity is degraded in order to minimize the cost of loading the video data to the UE (client).

In response to the further warning signal the at least one further network element may generate (using information comprised in the further warning signal) and provide instructions for adjusting the at least one parameter to an application providing the video data for the loading to the user equipment.

For example, during the monitoring it may be determined by the at least one network element that after a further time interval the user equipment will undertake handover (HO) from a current cell (e.g., a HeTNET) to a further cell (e.g., a macro cell), where the cost for the loading video data in the further cell is higher than in the current cell and is beyond the at least one threshold, which may trigger providing the second warning signal. This HO to the further cell (as could be further determined by the at least one network element) may be for a short period of time after which the UE may return back to the current cell. Thus an additional pre-filling before the HO to the further cell will provide a desirable cost reduction of the video data loading.

Also, during the monitoring it may be determined by the at least one network element that the user equipment is moving in a direction away from a eNB and it may be further predicted that the connectivity is to be degraded, so that a cost for the loading video data will increase beyond at least one threshold, which may trigger providing the second warning signal.

Furthermore, according to another embodiment, the at least one network element may collect relevant information about movement, location and connectivity of the UE using cellular methods (MDT, UE TRACE etc.) and/or GPS methods, known in the art (e.g., using APPLE server in case of loading the APPLE video data).

Also it is further noted that the at least one network element described above may include one or more of the network elements such as SON, C-SON, Node B or eNB, or MME, as shown in FIG. 1, and the like. In other words, the "main" network element (e.g., SON or C-SON) generating the warning signal and/or the further warning signal 112a or 112b (see FIG. 1), may be assisted by other network elements like eNB and/or MME for determining information for the warning signals. For example, the MME may provide information about history of handovers for the particular UE which may show a pattern, so that the UE location may be predicted based on that history, and/or the eNB may monitor and provide information about instantaneous movement of the UE. Alternatively the Node B (or MME, CAN-EG or the like) may be the "main" network element collecting all relevant information and generating and sending the warning signal and/or the further warning signal, as described herein.

The embodiments of the invention provide improvements and advantages for wireless mobile users which may include (but are not limited to): eliminating/reducing gaps in playing video to improve user experience, preventing loading extra video data in case the user abort watching the video before reaching the end of the video, finding a balance when applicable between up front buffering and just-in-time fetching, minimizing the cost of video loading, minimizing the use of video compression, applicability to the optimized delivery of video both with and without media optimizers and adaptive streaming servers (e.g. APPLE, MICROSOFT servers), etc.

Figure 2:
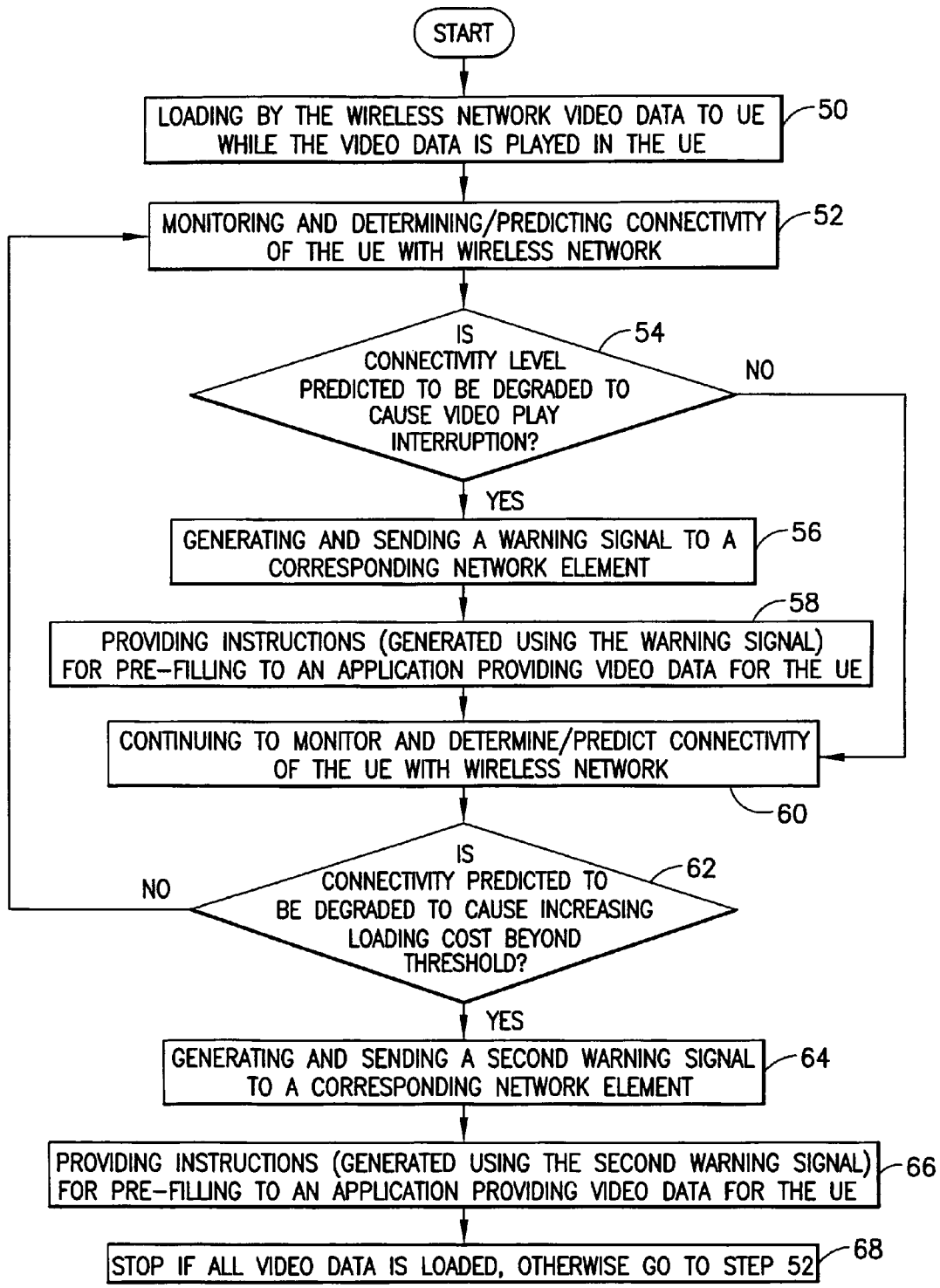
FIG. 2 is a flow chart demonstrating implementation of exemplary embodiments of the invention.

FIG. 2 shows an exemplary flow chart demonstrating implementation of embodiments of the invention. It is noted that the order of steps shown in FIG. 2 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 2, in a first step 50, the wireless network is loading video data to a UE while this video data is played in the UE. In a next step 52, at least one (one or more) network element (e.g., SON, C-SON Node B, eNB, MME or CAN-EG shown in FIG. 1) is monitoring and determining/predicting connectivity of the UE with the wireless network (definition of "connectivity" for the purposes of this invention is presented above). In a next step 54, it is determined whether the connectivity/conductivity level (e.g., received RF power) is predicted to be degraded without a possibility for HO to cause video play interruption/deterioration. If that is not the case, the process goes to step 60 to continue monitoring the connectivity.

However, if it is determined/predicted that the connectivity level is to be degraded without a possibility for handover to cause video play interruption/deterioration, as described herein, then in step 56, the at least one network element generates and sends a warning signal (e.g., shown as signals 112a or 112b from the SON 112 in FIG. 1) comprising the determined information on the connectivity (e.g., the timing information including the time when the degradation of the connectivity may occur and possibly predicted duration of the anticipated interruption/degradation) to at least one further network element (e.g., CAN-EG, PCRF or MO shown in FIG. 1). Then in a next step 58, the at least one further network element (e.g., CAN-EG, PCRF or MO) generates (using the warning signal) and provides instructions for adjusting the at least one or more parameters to an application providing the video data for the loading to the user equipment. As explained herein the adjusting one or more parameters may include (but is not limited to) increasing available usage capacity of the channel transmitting video data and/or using data compression, etc.

The monitoring by the at least one network element is continued in step 60. Then in a next step 62, it is further determined whether the connectivity is predicted to be degraded to cause increasing the loading video cost beyond a threshold. If that is not the case, the process goes back to step 52 to continue monitoring the connectivity.

However, if it is determined/predicted that the connectivity level is to be degraded to cause increasing the loading video cost beyond a threshold, then in step 64, the at least one network element generates (using the further warning signal) and provides a second warning signal comprising a further determined information (as described above) on the connectivity to the at least one further network element (e.g., CAN-EG, PCRF, MO as shown in FIG. 1) in the wireless network to adjust the one or more parameters for loading the video data to the user equipment to provide the pre-filling before the connectivity is degraded in order to minimize the cost of loading the video data to the UE (client).

In a next step 66, in response to the further warning signal, the at least one further network element provides instructions for adjusting the at least one parameter to an application providing the video data for the loading to the user equipment. In step 68, if all the video data (intended for playing) is loaded, the process is stopped, otherwise the process goes back to step 52 to continue monitoring the connectivity.

Figure 3:
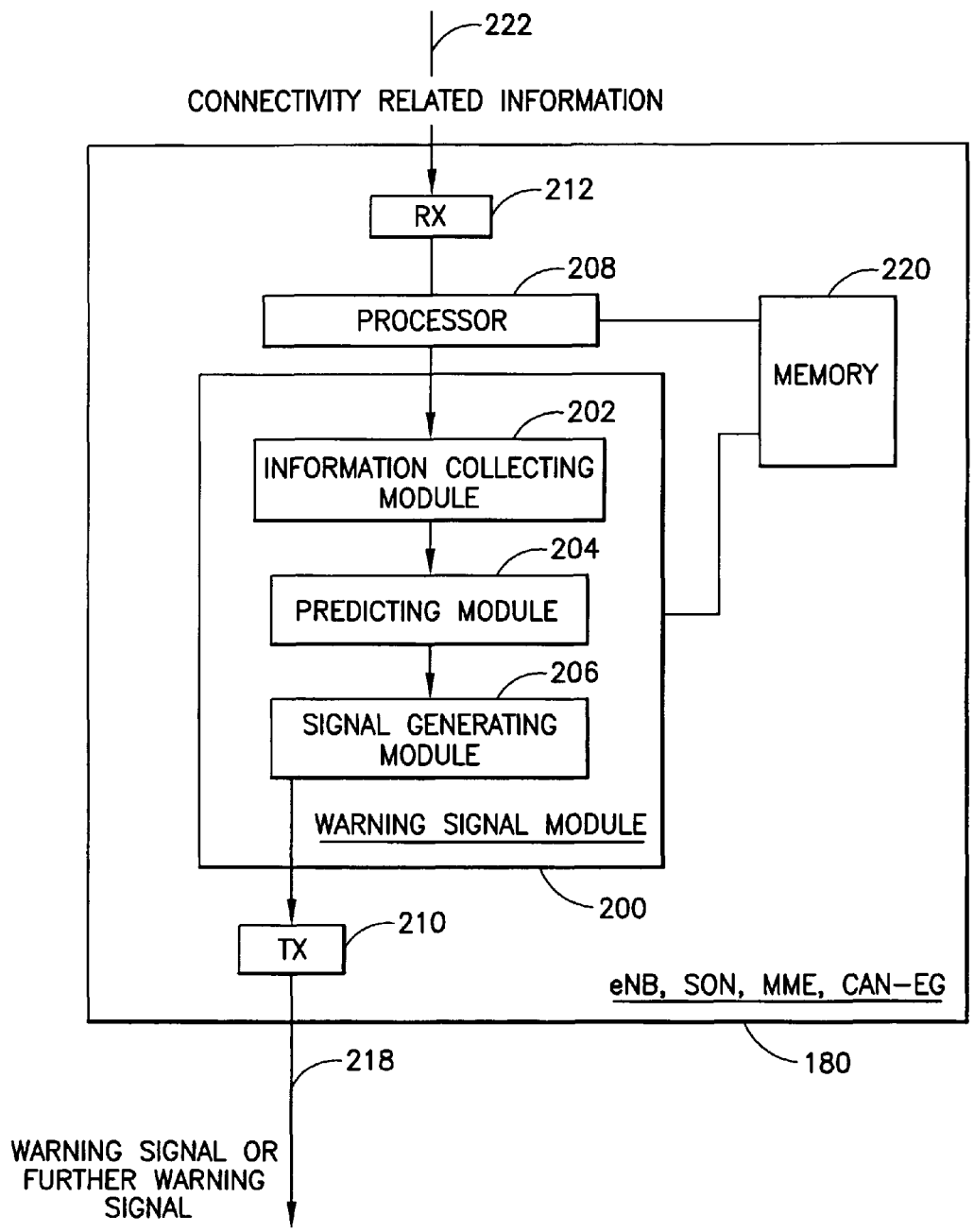
FIG. 3 is a block diagram of a network element for practicing exemplary embodiments of the invention.

FIG. 3 shows an example of a simplified block diagram of a LTE wireless device 180 (e.g., SON, C-SON, eNB, CAN-EG or MME) for practicing exemplary embodiments of the invention. The LTE wireless device 180 comprises a signal forming module 200, at least one processor 208, at least one memory 220, at least one transmitter 210 and at least one receiver 212 for transmitting and receiving corresponding wireless signals (transmitting and receiving antennas are not shown in FIG. 3).

The signal forming module 200 comprises an information collecting module 202 for monitoring information related to connectivity using signal 222, e.g., for implementing steps 52 and 60 in FIG. 2, a predicting module 204 for determining if conditions for providing warning signals exists, e.g., for implementing per steps 54 and 62 in FIG. 2, and a signal generating module 206 for generating the warning signals 218, e.g., for implementing steps 56 and 64 in FIG. 2.

The transmitter 210 and the receiver 212 may be generally means for transmitting/receiving and may be implemented as a transceiver, or a structural equivalence (equivalent structure) thereof.

Various embodiments of the at least one memory 220 (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 208 include but are not limited to general purpose computers, special purpose computers, microprocessors, digital signal processors (DSPs) and multi-core processors.

The signal forming module 200, or each of the modules 202, 204 and 206 may be implemented as an application computer program stored, e.g., in the at least one memory 220, but in general it may be implemented as a software, a firmware and/or a hardware module or a combination thereof. In particular, in the case of software or firmware, one embodiment may be implemented using a software related product such as a computer readable memory (e.g., a non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 200, 202, 204 or 206 may be implemented as a separate block or may be combined with any other module/block of the module 200 or it may be split into several blocks according to their functionality. Moreover, it is noted that all or selected modules of the module 200 may be implemented using an integrated circuit (e.g., using an application specific integrated circuit, ASIC).

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
monitoring by at least one network element of a wireless network a connectivity of a user equipment of a current cell with the wireless network in response to video data being pre-filled at the user equipment with the wireless network to be played by the user equipment; and
determining, by the at least one network element, using a predetermined criterion based on at least a current location and a movement of the user equipment, that the connectivity is predicted to be degraded such that there will be no possibility for a handover and a throughput of the video data being pre-filled will drop below a minimum bit rate required for an application pre-filling the video data causing the played video data to be interrupted or deteriorated below an acceptable quality level, wherein it is further determined by the at least one network element, based on a further predetermined criterion, that the connectivity is predicted to be degraded so that a cost for the pre-filling video data will increase beyond at least one threshold; and
then providing by the at least one network element a warning signal comprising a determined information on the connectivity to be degraded to at least one further network element in the wireless network to cause the at least one further network element to adjust one or more parameters of the wireless network for the pre-filling the video data to the user equipment to provide an additional pre-filling of the video data before the connectivity is degraded to cause playing the video data substantially without interruption;
wherein during monitoring it is determined that after a further time interval the user equipment will undertake handover from the current cell to a further cell, where the cost for the pre-filling video data in the further cell is higher than in the current cell and is beyond the at least one threshold, which triggers providing a second warning signal; and wherein the cost is the cost for one bit of information.

2. The method of claim 1, wherein the determining comprises determining a predicted time interval after which the predicted interruption or deterioration of the playing video data will begin, and a predicted duration of time during which the predicted interruption or deterioration of the playing video data will happen unless the additional pre-filling is provided.

3. The method of claim 1, wherein the determining comprises determining that the movement of the user is towards a coverage gap area, and wherein the determining comprises determining based on the current location of the user equipment a time period after which the user equipment will reach the coverage gap area where the connectivity is predicted to be degraded.

4. The method of claim 1, wherein the minimum bit rate required by the application pre-filling the video data is varied by the application, and wherein the determining is based on a minimum bit rate that can be varied to by the application for the pre-filling.

5. The method of claim 1, wherein the adjusting the one or more parameters of the wireless network comprises at least one of increasing an available usage capacity of a channel of the wireless network that is transmitting the video data, and compressing the video data in the wireless network.

6. The method of claim 1, wherein the warning signal is sent to at least one further network element to provide instructions for adjusting the at least one parameter to the application for the leading pre-filling to the user equipment, the instructions being generated using the warning signal.

7. The method of claim 1, wherein the at least one network element is a Node B, a self optimizing network, a mobility management entity or a content aware network—enabling gateway.

8. The method of claim 1, wherein the at least one further network element comprises a content aware network, a content aware network—enabling gateway, a policy and charging rule function network element or a media optimizer.

9. The method of claim 1, wherein
the providing the second warning signal comprises providing a further determined information on the connectivity to be degraded to the at least one network element in the wireless network to adjust the one or more parameters for pre-filling the video data to the user equipment to provide the additional pre-filling before the connectivity is degraded in order to minimize the cost of pre-filling the video data to the user equipment.

10. The method of claim 9, wherein the cost for pre-filling comprises a radio frequency cost associated with a level of throughput and a bit rate required for the application pre-filling the video data.

11. The method of claim 1, wherein it is further predicted that the handover to the further cell is for a period of time after which the user equipment will undertake a further handover back to the current cell.

12. The method of claim 1, wherein the user equipment is moving in a direction away from a Node B and it is predicted that the connectivity is to be degraded so that a cost for the pre-filling the video data will increase beyond at least one threshold, which triggers providing the second warning signal.

13. The method of claim 1, wherein the further warning signal is sent to at least one further network element to provide instructions for adjusting the at least one parameter to the application pre-filling the video data to the user equipment, the instruction being generated using the further warning signal.

14. An apparatus comprising:
at least one processor: and
at least one memory including computer program code, in which the at least one memory including the computer program code is configured, with the at least one processor to cause the apparatus to:
monitor in a wireless network a connectivity of a user equipment of a current cell with the wireless network in response to video data being pre-filled at the user equipment with the wireless network to be played by the user equipment; and
determining, using a predetermined criterion based on at least a current location and a movement of the user equipment, that the connectivity is predicted to be degraded such that there will be no possibility for a handover and a throughput of the video data being pre-filled will drop below a minimum bit rate required for an application pre-filling the video data causing the played video data to be interrupted or deteriorated below an acceptable quality level, wherein it is further determined by the at least one network element, based on a further predetermined criterion, that the connectivity is predicted to be degraded so that a cost for the pre-filling video data will increase beyond at least one threshold; and
then provide a warning signal comprising a determined information on the connectivity to be degraded to at least one further network element in the wireless network to cause the at least one further network element to adjust one or more parameters of the wireless network for the pre-filling the video data to the user equipment to provide an additional pre-filling of the video data before the connectivity is degraded to cause playing the video data substantially without interruption;
wherein during monitoring it is determined that after a further time interval the user equipment will undertake handover from the current cell to a further cell, where the cost for the pre-filling video data in the further cell is higher than in the current cell and is beyond the at least one threshold, which triggers providing a second warning signal; and wherein the cost is the cost for one bit of information.

15. The apparatus of claim 14, wherein the determining comprises determining a predicted time interval after which the predicted interruption or deterioration of the playing video data will begin, and a predicted duration of time during which the predicted interruption or deterioration of the playing video data will happen unless the additional pre-filling is provided.

16. The apparatus of claim 14, wherein the determining comprises determining that the movement of the user equipment is towards a coverage gap area, and wherein the determining comprises determining based on the current location of the user equipment a time period after which the user equipment will reach the coverage gap area where the connectivity is predicted to be degraded.

17. The apparatus of claim 14, wherein the warning signal is sent to at least one further network element to provide instructions for adjusting the at least one parameter to the application for the pre-filling to the user equipment, the instructions being generated using the warning signal.

18. The apparatus of claim 14, wherein the at least one memory including the computer program code is configured with the at least one processor to cause the apparatus element to
provide with the second warning signal further determined information on the connectivity to be degraded to the at least one network element in the wireless network to adjust the one or more parameters for the pre-filling the video data to the user equipment to provide the additional pre-filling before the connectivity is degraded in order to minimize the cost of the pre-filling the video data to the user equipment.

19. A non-transitory computer readable memory encoded with a computer program comprising computer readable instructions recorded thereon for execution of a method comprising:
monitoring by at least one network element of a wireless network a connectivity of a user equipment of a current cell with the wireless network in response to video data being pre- filled at the user equipment with the wireless network to be played by the user equipment; and
determining, by the at least one network element, using a predetermined criterion based on at least a current location and a movement of the user equipment, that the connectivity is predicted to be degraded such that there will be no possibility for a handover and a throughput of the video data being pre-filled will drop below a minimum bit rate required for an application pre-filling the video data causing the played video data to be interrupted or deteriorated below an acceptable quality level, wherein it is further determined by the at least one network element, based on a further predetermined criterion, that the connectivity is predicted to be degraded so that a cost for the pre-filling video data will increase beyond at least one threshold; and
then providing by the at least one network element a warning signal comprising a determined information on the connectivity to be degraded to at least one further network element in the wireless network to cause the at least one further network element to adjust one or more parameters of the wireless network for the pre-filling the video data to the user equipment to provide an additional pre-filling of the video data before the connectivity is degraded to cause playing the video data substantially without interruption;
wherein during monitoring it is determined that after a further time interval the user equipment will undertake handover from the current cell to a further cell, where the cost for the pre-filling video data in the further cell is higher than in the current cell and is beyond the at least one threshold, which triggers providing the second warning signal; and wherein the cost is the cost for one bit of information.

20. The non-transitory computer readable memory of claim 19, wherein
providing the second warning signal comprises providing further determined information on the connectivity to be degraded to the at least one network element in the wireless network to adjust the one or more parameters for the pre-filling the video data to the user equipment to provide the additional pre-filling before the connectivity is degraded in order to minimize the cost of loading the video data to the user equipment.

* * * * *